(12) United States Patent
Wang et al.

(10) Patent No.: US 11,455,117 B2
(45) Date of Patent: Sep. 27, 2022

(54) DATA READING METHOD, APPARATUS, AND SYSTEM, AVOIDING VERSION ROLLBACK ISSUES IN DISTRIBUTED SYSTEM

(71) Applicant: HUAWEI TECHNOLOGIES CO., LTD., Shenzhen (CN)

(72) Inventors: Chen Wang, Shanghai (CN); Chun Liu, Santa Clara, CA (US); Wei Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/166,233

(22) Filed: Feb. 3, 2021

(65) Prior Publication Data

US 2021/0157513 A1 May 27, 2021

Related U.S. Application Data

(63) Continuation of application No. PCT/CN2019/079389, filed on Mar. 23, 2019.

(30) Foreign Application Priority Data

Aug. 8, 2018 (CN) .......................... 201810895151.6

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01)
(58) Field of Classification Search
CPC ....... G06F 3/067; G06F 3/0655; G06F 3/0604
See application file for complete search history.

(56) References Cited

U.S. PATENT DOCUMENTS

| 8,010,485 B1 | 8/2011 | Chatterjee et al. |
| 8,793,527 B1 * | 7/2014 | Franks .................. G06F 3/0659 709/219 |

(Continued)

FOREIGN PATENT DOCUMENTS

| CN | 103530362 A | 1/2014 |
| CN | 103729352 A | 4/2014 |

(Continued)

OTHER PUBLICATIONS

Gaochao Xu. "Distributed Computing System." Higher Education Publishing House. Jan. 2004. 55 pages with partial English translation.

(Continued)

*Primary Examiner* — Mark A Giardino, Jr.
(74) *Attorney, Agent, or Firm* — Maier & Maier, PLLC

(57) ABSTRACT

A data reading method, apparatus, and system, and a distributed system, related to the field of storage technologies and can be applied to data reading. The method includes: receiving a data read request sent by a terminal, where the data read request includes a logical address of target data; locally searching, based on the logical address, a first slave node for a latest version of the target data; and, when it is determined that the latest version of the target data has been stored in each of a plurality of slave nodes, sending the latest version of the target data to the terminal. This data reading method, apparatus, system, and distributed system can avoid a rollback of a version of read data.

10 Claims, 4 Drawing Sheets

(56) References Cited

U.S. PATENT DOCUMENTS

| | | | |
|---|---|---|---|
| 2006/0155946 A1 | 7/2006 | Ji | |
| 2014/0115252 A1* | 4/2014 | Yu | G06F 3/067 |
| | | | 711/113 |
| 2016/0170850 A1 | 6/2016 | Williams et al. | |
| 2016/0246676 A1 | 8/2016 | Bakre et al. | |
| 2017/0153631 A1* | 6/2017 | Jonsson | H04L 67/146 |
| 2017/0228291 A1 | 8/2017 | Mokhtarzada et al. | |
| 2018/0165343 A1* | 6/2018 | Fan | H04W 4/06 |
| 2020/0310651 A1* | 10/2020 | Kjellin | G06F 3/0619 |

FOREIGN PATENT DOCUMENTS

| | | |
|---|---|---|
| CN | 103858122 A | 6/2014 |
| CN | 104348913 A | 2/2015 |
| CN | 105468302 A | 4/2016 |
| CN | 106406758 A | 2/2017 |
| CN | 106980476 A | 7/2017 |
| CN | 108183965 A | 6/2018 |
| CN | 108228750 A | 6/2018 |
| CN | 108234641 A | 6/2018 |
| WO | 2016065610 A1 | 5/2016 |

OTHER PUBLICATIONS

Pengcheng Wei. "Research on Technology and Practice of Cloud Computing Architecture Based on Virtualization Technology." Chapter 10: Google Cloud Computing Principles and Application Analysis. Jun. 2018. 27 pages with partial English translation.

* cited by examiner

DATA READING METHOD, APPARATUS, AND SYSTEM, AVOIDING VERSION ROLLBACK ISSUES IN DISTRIBUTED SYSTEM

CROSS-REFERENCE TO RELATED APPLICATIONS

This application is a continuation of International Application No. PCT/CN2019/079389, filed on Mar. 23, 2019, which claims priority to Chinese Patent Application No. 201810895151.6 filed on Aug. 8, 2018. The disclosures of the aforementioned applications are hereby incorporated by reference in their entireties.

TECHNICAL FIELD

The embodiments relate to the field of storage technologies, and in particular, to a data reading method, apparatus, and system, and a distributed system.

BACKGROUND

As storage technologies develop, a distributed system is widely applied. The distributed system includes a master node and a plurality of slave nodes that are configured to store same data. A terminal can write data to the distributed system by using the master node, and read the data stored in any one of the nodes.

In the related art, before a terminal writes a latest version of target data to a distributed system by using a master node, the terminal may send, to the master node, a data write request for writing the latest version of the target data. Then, the master node may locally store the latest version of the target data and separately copy the latest version of the target data to each slave node, so that the latest version of the target data is stored in all nodes in the distributed system. After the terminal sends a data read request for reading the target data to a slave node, the slave node may send the locally stored latest version of the target data to the terminal.

However, it is assumed that when a first slave node completes copying the latest version of the target data, and a second slave node has not completed copying the latest version of the target data, if the terminal sequentially reads the target data from the first slave node and the second slave node, a version that is of the target data and that is read at a second time is earlier than a version that is of the target data and that is read at a first time. Therefore, the version of the read data is rolled back.

SUMMARY

The embodiments provide a data reading method, apparatus, and system, and a distributed system, to avoid a rollback of a version of read data.

According to a first aspect, a data reading method is provided, where the method is applied to a first slave node in a distributed system, the distributed system includes a master node and a plurality of slave nodes, the first slave node is any one of the plurality of slave nodes, and the method includes: receiving a data read request sent by a terminal, where the data read request includes a logical address of target data; locally searching, based on the logical address, the first slave node for a latest version of the target data; and when it is determined that the latest version of the target data has been stored in each of the plurality of slave nodes, sending the latest version of the target data to the terminal.

According to the data reading method provided in an embodiment, after the slave node receives the data read request, the latest version of the target data may be searched for based on the data read request, and after it is determined that the latest version has been stored in each slave node, the latest version of the target data is sent to the terminal. When the first slave node completes copying the latest version of the target data, and the second slave node has not completed copying the latest version of the target data, if the terminal sequentially reads the target data from the first slave node and the second slave node, the terminal can read the latest version of the target data from both the first slave node and the second slave node. This can ensure that a version of the target data read each time by the terminal is not earlier than a previously read version of the target data, to avoid a rollback of a version of read data.

Optionally, the method further includes: receiving indication information sent by the master node, where the indication information is used to indicate that the latest version of the target data has been stored in each of the plurality of slave nodes. In other words, the indication information sent by the master node is used to inform whether the latest version of the target data has been stored in the plurality of slave nodes.

Optionally, the locally searching, based on the logical address, of the first slave node for a latest version of the target data includes: obtaining, based on the logical address, an index of the target data; and locally searching, based on the index of the target data, the first slave node for a latest version of the target data that is corresponding to the index. In other words, in the first slave node, the index is used to identify the target data. Therefore, the index may be used to search for the latest version of the target data.

Optionally, the method further includes: receiving the latest version of the target data and the index that are sent by the master node; when data corresponding to the index is locally stored in the first slave node, replacing, with the latest version of the target data, the data that is corresponding to the index and that is locally stored in the first slave node; and sending a feedback, to the master node, that the latest version of the target data has been locally stored. According to the data reading method provided in this embodiment, because each node needs to store only the latest version of the target data, comparatively less data is stored in each node, and load of the distributed system is comparatively small. In addition, when the terminal reads the target data from a slave node, if the latest version of the target data is stored in the slave node, and it is determined that the latest version has been stored in each slave node, the latest version of the target data may be immediately sent to the terminal. This enables the terminal to quickly read the latest version of the target data, thereby reducing a data reading delay.

Optionally, the method further includes: when receiving the latest version of the target data sent by the master node, receiving a version number of the latest version sent by the master node; and the sending a feedback, to the master node, that the latest version of the target data has been locally stored includes: sending storage feedback information to the master node, where the storage feedback information includes the index and the version number of the latest version, and the indication information includes the index and the version number of the latest version. In other words, in this embodiment, version numbers are used to identify different versions of same data.

According to a second aspect, the embodiments provide a data reading apparatus. The data reading apparatus includes modules for performing the data reading method according to any one of the first aspect or the possible implementations of the first aspect.

According to a third aspect, a data reading apparatus is provided. The data reading apparatus includes at least one processor, at least one interface, a memory, and at least one communications bus, where the processor is configured to execute a program stored in the memory to implement the data reading method according to the first aspect.

According to a fourth aspect, a distributed system is provided. The distributed system includes a master node and a plurality of slave nodes, and any one of the plurality of slave nodes includes the data reading apparatus according to the second aspect, or any one of the plurality of slave nodes includes the data reading apparatus according to the third aspect.

According to a fifth aspect, a data reading system is provided. The data reading system includes a terminal and the distributed system according to the fifth aspect.

According to a sixth aspect, a computer-readable storage medium is provided. The computer-readable storage medium stores an instruction, and when the computer-readable storage medium runs on a computer, the computer is enabled to perform the data reading method according to the first aspect.

According to a seventh aspect, a computer program product including an instruction is provided. When the computer program product runs on a computer, the computer performs the data reading method according to the first aspect.

DETAILED DESCRIPTION OF THE EMBODIMENTS

To make the objectives, technical solutions, and advantages of the embodiments clearer, the following further describes implementations in detail with reference to the accompanying drawings.

Figure 1:
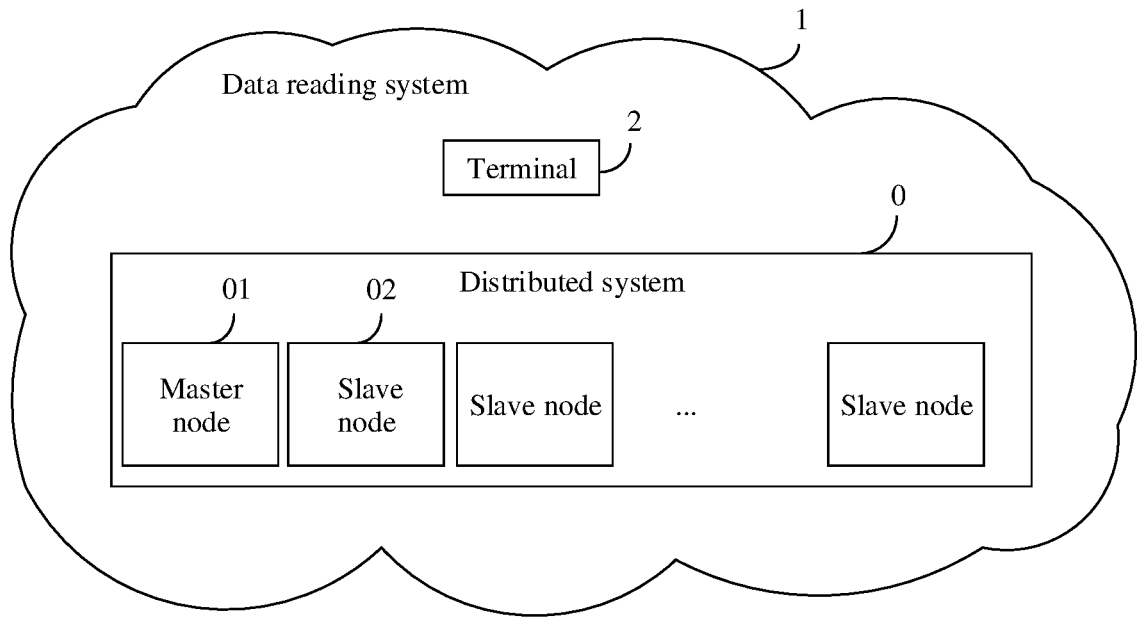
FIG. 1 is a schematic structural diagram of a data reading system according to an embodiment.

FIG. 1 is a schematic structural diagram of a data reading system according to an embodiment. As shown in FIG. 1, the data reading system 1 may include a distributed system 0 and a terminal 2.

The distributed system 0 may include a master node 01 and a plurality of slave nodes 02. Both the master node 01 and the slave node 02 may be a server, or a server cluster including a plurality of servers, or another device having a storage function. This is not limited in this embodiment. The terminal 2 may store data in or read data from the distributed system 0. For example, the terminal 2 may be an electronic device such as a mobile phone, a computer, or a camera.

Figure 2:
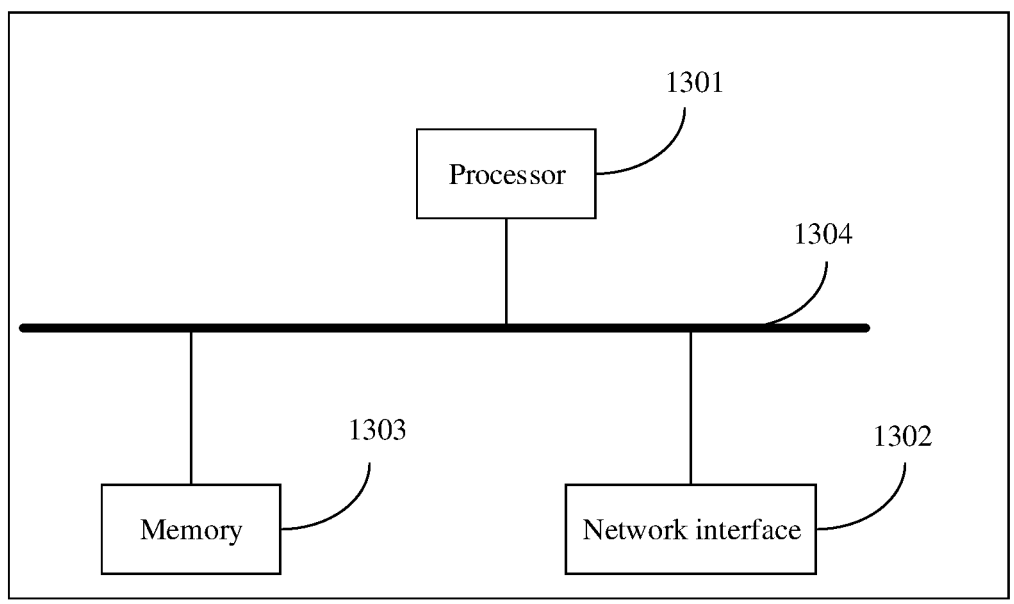
FIG. 2 is a schematic structural diagram of a data reading apparatus according to an embodiment.

As shown in FIG. 2, each apparatus in the master node 01, the slave node 02, and the terminal 2 may include at least one processor 1301 (for example, a central processing unit), at least one network interface 1302, a memory 1303, and at least one bus 1304. The bus 1304 is configured to implement a communication connection between the processor, the network interface, and the memory; and the memory 1303 and the network interface 1302 are separately connected to the processor 1301 by using the bus 1304. The processor 1301 is configured to execute an executable module stored in the memory 1303, for example, a computer program. The memory 1303 may include a high-speed random access memory (RAM), and may also further include a non-volatile memory, for example, at least one magnetic disk memory. A communication connection between the apparatus and at least one another apparatus is implemented through the at least one network interface 1302 (which is wired or wireless). In some implementations, the memory 1303 stores a program. The program can be executed by the processor 1301 to perform a data reading method provided in embodiments.

The master node 01 may establish a communication connection to each slave node 02, and the terminal 02 may establish a communication connection to each node. For example, the foregoing communication connections may all be wired network connections or wireless network connections. The wired network connections may include, but is not limited to, a universal serial bus (USB) connection, and the wireless network connections may include, but is not limited to: a wireless fidelity (WiFi) connection, a Bluetooth connection, an infrared connection, a ZigBee connection, a data connection, and the like.

Figure 3A:
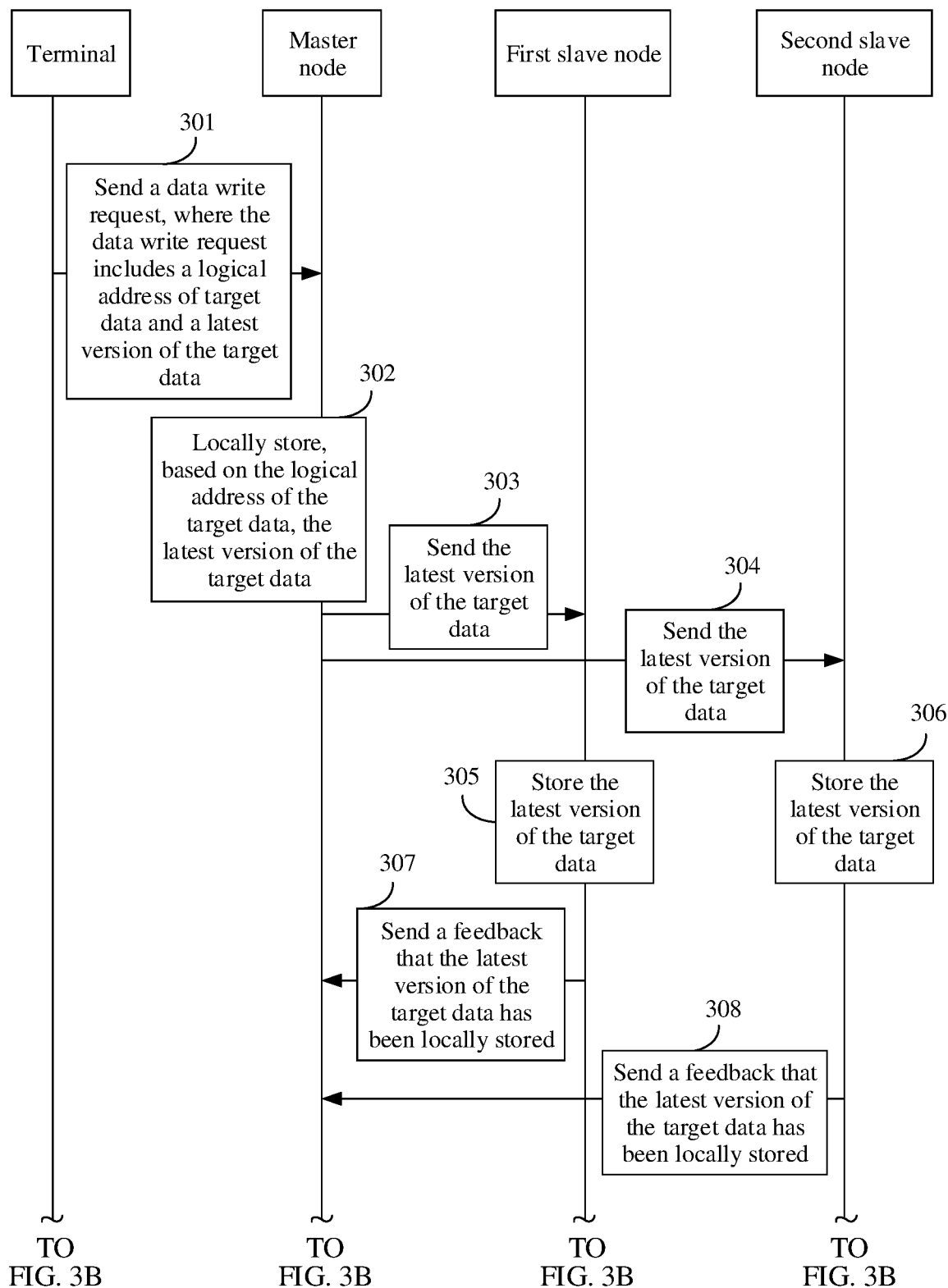
FIG. 3A is a flowchart of a data reading method according to an embodiment.
Figure 3B:
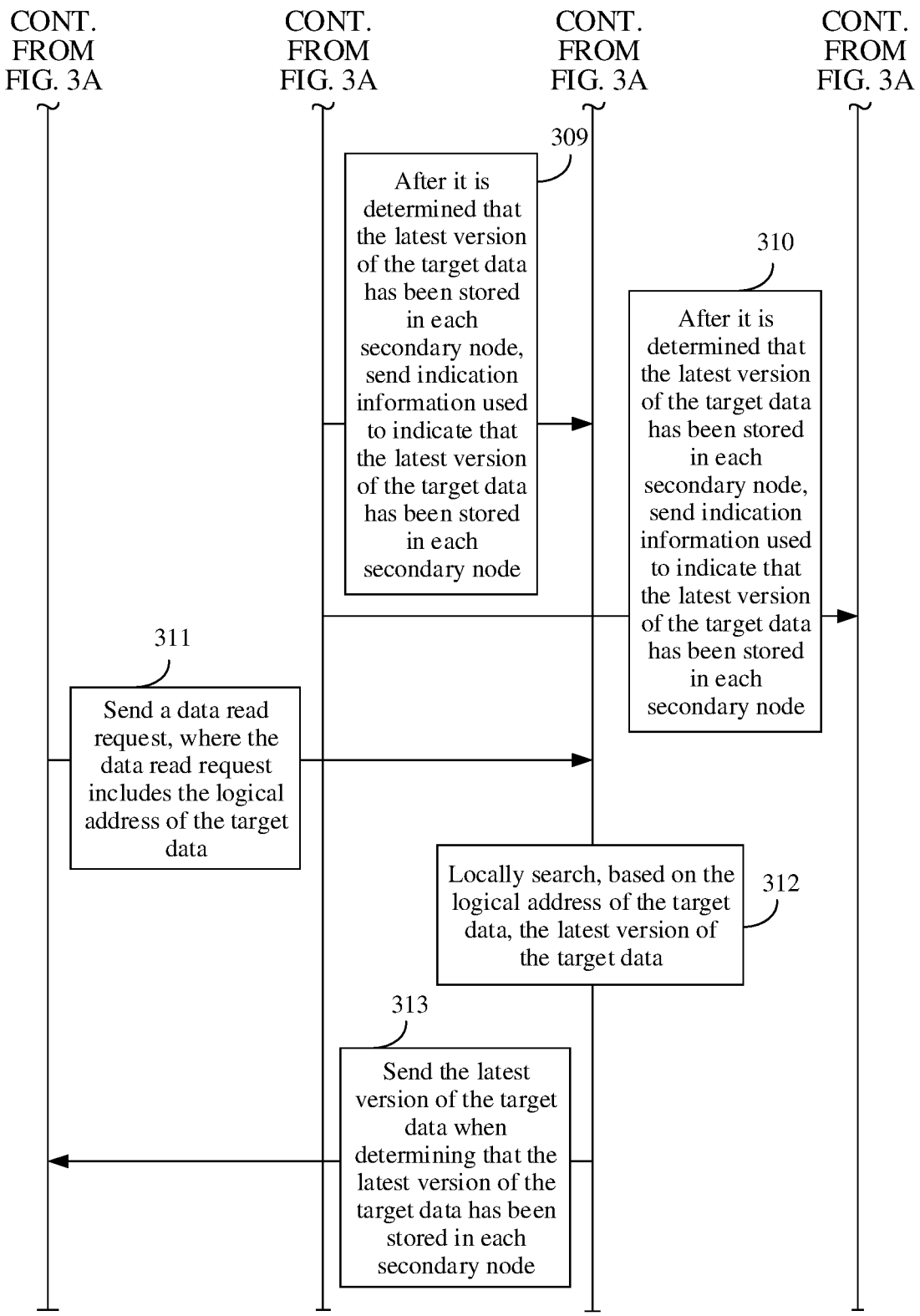
FIG. 3B is also a flowchart of a data reading method according to an embodiment.

FIG. 3A and FIG. 3B are a flowchart of a data reading method according to an embodiment. The data reading method may be applied to the data reading system shown in FIG. 1. In addition, in FIG. 3A and FIG. 3B, an example in which the data reading system includes only a first slave node and a second slave node, and a terminal reads data from the first slave node is used. As shown in FIG. 3A and FIG. 3B, the data reading method may include the following steps.

Step 301: The terminal sends a data write request to a master node, where the data write request includes a logical address of target data and a latest version of the target data.

The target data is data to be written by the terminal to a distributed system. The target data may be data or metadata used for describing data. This is not limited in this embodiment.

Step 302: The master node locally stores, based on the logical address of the target data, the latest version of the target data.

After receiving the data write request sent by the terminal, the master node may obtain the logical address of the target data in the data write request and the latest version of the target data.

It can be noted that each node in the distributed system has a plurality of physical addresses and each physical address is corresponding to a logical address. After obtaining the logical address of the target data from the data write request, the master node may locally search for a physical address corresponding to the logical address and determine whether there is data stored in the physical address. When there is no data stored in the physical address, the master node stores the latest version of the target data in the physical address; and when there is data stored in the physical address, the master node replaces the data stored in the physical address with the latest version of the target data.

Step 303: The master node sends the latest version of the target data to the first slave node.

After receiving the latest version of the target data from the data write request, the master node may further copy the target data to each slave node.

Optionally, when sending the latest version of the target data to each slave node, the master node may further send an index of the target data and a version number of the latest version to each slave node. It can be noted that, a same preset algorithm used to calculate an index is set for each node. An operation is performed, by using a preset algorithm (for example, a Hash algorithm), on the logical address corresponding to each physical address to obtain an index of the data stored in the physical address. The master node may use the preset algorithm to perform an operation on the logical address of the target data to obtain the index of the target data and may record the index of the target data.

The version number of the latest version of the target data may be generated by the master node based on the received version of the target data. Alternatively, the version number may be carried in the data write request and is obtained by the master node from the data write request. This is not limited in this embodiment. Optionally, a plurality of version numbers of the target data may increase sequentially. For example, a version number of the target data written at a first time (namely, a first version of the target data) may be 01; a version number of the target data written at a second time (namely, a second version of the target data) may be 02; and a version number of the target data written at a third time (namely, a third version of the target data) may be 03.

Step 304: The master node sends the latest version of the target data to the second slave node.

For step 304, refer to step 303. Details are not described in this embodiment again.

Step 305: The first slave node stores the latest version of the target data.

Optionally, after receiving the latest version of the target data and the index of the target data, the first slave node may determine, by detecting whether the index is locally recorded, whether data corresponding to the index is locally stored. When the index is locally stored in the first slave node, it is determined that the data corresponding to the index is locally stored, and the data that is corresponding to the index and that is locally stored can be directly replaced with the latest version of the target data.

For example, it is assumed that an index S1 in the first slave node is corresponding to a user name (a type of target data). When receiving a latest version of the user name and the index S1 of the user name, if data corresponding to the index is locally stored in the first slave node, the first slave node may replace the data corresponding to the index with the received latest version of the user name, so as to update a locally stored user name.

If the first slave node does not locally record the data corresponding to the index of the target data, the first slave node may determine, by using an inverse operation of the preset algorithm, a logical address of the target data. The first slave node further determines a physical address corresponding to the logical address of the target data and stores the latest version of the target data in the physical address. Therefore, data stored in the physical address is only the latest version of the target data.

Optionally, in step 305, the first slave node may not determine whether the data corresponding to the index of the target data is stored, but directly determines, by using the inverse operation of the preset algorithm, a logical address of the target data. The first slave node further determines a physical address corresponding to the logical address of the target data and stores the latest version of the target data in the physical address. Therefore, data stored in the physical address is only the latest version of the target data.

Step 306: The second slave node stores the latest version of the target data.

For step 306, refer to step 305. Details are not described in this embodiment again.

Step 307: The first slave node sends a feedback, to the master node, that the latest version of the target data has been locally stored.

For example, after storing the latest version of the target data, the first slave node may send storage feedback information to the master node. The storage feedback information may include the index of the target data and the version number of the latest version of the target data, and the storage feedback information is used to indicate that the latest version of the target data has been locally stored.

Step 308: The second slave node sends a feedback, to the master node, that the latest version of the target data has been locally stored.

For step 308, refer to step 307. Details are not described in this embodiment again.

Step 309: After determining that the latest version of the target data has been stored in each slave node, the master node sends, to the first slave node, indication information used to indicate that the latest version of the target data has been stored in each slave node.

After receiving the feedback, sent by each slave node, that the latest version of the target data has been stored, the master node may determine that the latest version of the target data has been stored in each slave node. In this case, the master node may send the indication information to each slave node to inform each slave node that the latest version has been stored in each slave node.

For example, the indication information may include the index of the target data and the version number of the latest version. The index is used to indicate the target data, and the version number of the latest version is used to indicate the latest version, that is, the indication information is used to indicate that the latest version of the target data has been stored in each slave node.

Step 310: After determining that the latest version of the target data has been stored in each slave node, the master node sends, to the second slave node, indication information used to indicate that the latest version of the target data has been stored in each slave node.

For step 310, refer to step 309. Details are not described in this embodiment again.

Step 311: The terminal sends a data read request to the first slave node, where the data read request includes the logical address of the target data.

When needing to read the target data, the terminal may send the data read request to any node in the distributed system. This embodiment provides an example in which the terminal sends the data read request to the first slave node, and the data read request includes the logical address of the target data.

Step 312: The first slave node locally searches, based on the logical address of the target data, for the latest version of the target data.

For example, after receiving the data read request sent by the terminal, the first slave node may obtain the logical address from the data read request (namely, the logical address of the target data), and then use the preset algorithm to perform an operation on the logical address to obtain the index of the target data. After obtaining the index of the target data, the first slave node may search, based on the locally recorded index of each data, for the data corresponding to the index, and determine the data corresponding to the index as the latest version of the target data.

Step 313: The first slave node sends the latest version of the target data to the terminal when determining that the latest version of the target data has been stored in each slave node.

After finding the latest version of the target data, the first slave node needs to search the indication information sent by the master node for the indication information used to indicate that the target data has been already stored in each slave node. For example, the first slave node may detect whether the indication information including the index of the target data is received, and if the indication information is received, detect whether the indication information includes the indication information including the version number of the latest version of the target data. Optionally, if the plurality of version numbers of the target data increase sequentially, it may be detected, in the version numbers in the indication information, whether there is a version number that is not later than the version number of the latest version. If there is the version number, it may be determined that the indication information includes the indication information including the version number of the latest version of the target data.

If the first slave node receives the indication information, it may be determined, based on the indication information, that the latest version of the target data has been stored in each slave node. In this case, the first slave node may send the latest version of the target data to the terminal.

It can be noted that, if the first slave node detects that the indication information is not received, the first slave node keeps detecting whether the indication information is received until the indication information is received. This can ensure that the latest version of the target data in the first slave node is stored in each node.

For example, it is assumed that a node 1 is a master node, and a node 2 and a node 3 are slave nodes. When the node 1 receives a data write request for writing each version of target data, the node 1 may store the version of the target data and copy the version of the target data to each slave node. A time point at which a terminal sends a data read request is not fixed. After the node 2 receives the data read request for reading the target data, if the node 2 detects, after determining a locally-stored latest version of the target data, that the node 2 does not receive indication information including an index of the target data and a version number of the version, the node 2 does not send the version of the target data to the terminal. If the node 2 detects, after determining the locally-stored latest version of the target data, that the node 2 has received the indication information including the index of the target data and the version number of the version, the node 2 sends the version of the target data to the terminal. In other words, a prerequisite that the slave node sends the data to the terminal includes that the slave node receives the indication information including the index of the target data and the version number of the latest version of the data stored in the slave node.

In addition, when the master node receives the data read request sent by the terminal, the master node may obtain a logical address from the data read request, and determine, based on the logical address, an index of the target data. Then, the master node searches for a latest version of the target data corresponding to the index. The master node may further detect whether the latest version of the target data is stored in each slave node. For example, the master node may detect whether each slave node has sent a feedback that the latest version of the target data has been locally stored. When determining that each slave node has sent the feedback that the latest version of the target data has been locally stored, the master node may determine that the latest version of the target data is stored in each slave node, and may send the latest version of the target data to the terminal.

Therefore, in the data reading method provided in this embodiment, after receiving the data read request, the slave node may search, based on the data read request, for the latest version of the target data, and after it is determined that the latest version has been stored in each slave node, the latest version of the target data is sent to the terminal. When the first slave node completes copying the latest version of the target data, and the second slave node has not completed copying the latest version of the target data, if the terminal sequentially reads the target data from the first slave node and the second slave node, the terminal can read the latest version of the target data from both the first slave node and the second slave node. This can ensure that a version of the target data read each time by the terminal is not earlier than a previously read version of the target data, to avoid of a rollback of a version of read data.

In addition, according to the data reading method provided in this embodiment, because each node needs to store only the latest version of the target data, comparatively less data is stored in each node, and load of the distributed system is comparatively small. In addition, when the terminal reads the target data from a slave node, if the latest version of the target data is stored in the slave node, and it is determined that the latest version has been stored in each slave node, the latest version of the target data may be immediately sent to the terminal. This enables the terminal to quickly read the latest version of the target data, thereby reducing a data reading delay.

It can be noted that a sequence of the steps of the method embodiment provided in the embodiments can be adjusted properly, and a step may also be added or removed according to a situation. Any modified method that can be readily figured out by a person of ordinary skill in the art without departing from a scope in the embodiments shall fall within the protection scope, and therefore details are not described.

Optionally, in this embodiment, an example in which the index is used to identify the target data. In an actual implementation, the logical address may be further used to identify the target data.

For example, after storing the latest version of the target data, the master node may directly record the logical address of the target data instead of calculating and recording the index of the target data.

In step 303 and step 304, the master node may directly send the logical address of the target data to the slave node instead of sending the index of the target data to the slave node.

In step 305 and step 306, when storing the latest version of the target data, each slave node may detect whether the logical address of the target data is locally recorded. If the logical address of the target data is locally recorded in the slave node, data corresponding to the logical address is replaced with the latest version of the target data. If the logical address of the target data is not locally recorded in the slave node, the latest version of the target data is stored in the physical address corresponding to the logical address, so that only the latest version of the target data is stored in the physical address.

In step 307 and step 308, the storage feedback information sent by each slave node may include the logical address of the target data instead of the index of the target data.

In step 309 and step 310, the indication information sent by the master node to the slave node may include the logical address of the target data instead of the index of the target data.

In step 312, the first slave node may search for the latest version of the target data corresponding to the logical address of the target data instead of determining the index of the target data and searching for the latest version of the target data corresponding to the index of the target data.

Optionally, in step 305 and step 306, when receiving the latest version of the target data and the index of the target data that are sent by the master node, each slave node may directly store the latest version of the target data without replacing the data. In this way, the slave node stores all versions of the target data.

In this case, the first slave node may not perform step 312 and step 313 after performing step 311. Instead, after step 311, the first slave node may locally search, based on the logical address of the target data, for all versions of the target data. Then, the first slave node needs to search all versions of the target data for the latest version and detect whether the latest version of the target data has been stored in each slave node. When determining that the latest version of the target data has been stored in each slave node, the first slave node may send the found latest version of the target data to the terminal. When the latest version of the target data has not been stored in each slave node, the first slave node may find, in all versions of the target data, a new version that is second to the latest version, and detect whether the new version that is second to the latest version and that is of the target data has been stored in each slave node. When the new version that is second to the latest version and that is of the target data has not been stored in each slave node, the first slave node may send the new version that is second to the latest version and that is of the target data to the terminal.

That is, the first slave node may sequentially detect, from the latest version, whether each version meets a condition. The condition may be that the version of the target data has been stored in each slave node. Then, the first slave node may send the version of the target data that meets the condition to the terminal.

For example, it is assumed that a node 1 is a master node, and a node 2 and a node 3 are slave nodes. When the node 1 receives a data write request for writing each version of target data, the node 1 may store the version of the target data and copy the version of the target data to each slave node. A time point at which a terminal sends a data read request is not fixed. After receiving the data read request for reading the target data, the node 2 may locally search for all versions of the target data, and then detect, from the latest version, whether the version of the target data has been stored in each slave node, until the node 2 detects whether a given version of the target data has been stored in each slave node. Finally, the node 2 may send the version of the target data to the terminal.

In addition, when the master node receives the data read request sent by the terminal, the master node may obtain a logical address from the data read request, and determine an index corresponding to the logical address. Then, the master node searches for all versions of the target data corresponding to the index. The master node may further sequentially detect, from the latest version, whether each version of the target data has been stored in each slave node. When detecting whether a given version of the target data is stored in each slave node, the master node may detect whether each slave node has sent a feedback that the version of the target data has been locally stored. When determining that each slave node has sent the feedback that the version of the target data has been locally stored, the master node may determine that the version of the target data has been stored in each node. After determining that a given version of the target data is stored in each slave node, the master node may stop determining remaining versions in all versions and send the given version of the target data to the terminal.

Figure 4:
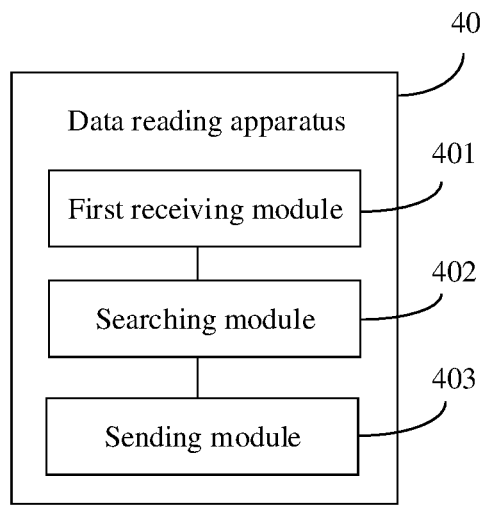
FIG. 4 is a schematic structural diagram of a data reading apparatus according to an embodiment.

FIG. 4 is a schematic structural diagram of a data reading apparatus according to an embodiment. The data reading apparatus may be applied to the first slave node in the distributed system in FIG. 1. The first slave node is any one of the plurality of slave nodes in the distributed system. As shown in FIG. 4, the data reading apparatus 40 may include:

a first receiving module 401 configured to receive a data read request sent by a terminal, where the data read request includes a logical address of target data;

a searching module 402 configured to: based on the logical address, locally search the first slave node for a latest version of the target data; and a sending module 403 configured to: when it is determined that the latest version of the target data has been stored in each of the plurality of slave nodes, send the latest version of the target data to the terminal.

Therefore, in the data reading apparatus provided in this embodiment, after the receiving module receives the data read request, the searching module may search, based on the data read request, for the latest version of the target data, and after it is determined that the latest version has been stored in each slave node, the sending module sends the latest version of the target data to the terminal. When the first slave node completes copying the latest version of the target data, and the second slave node has not completed copying the latest version of the target data, if the terminal sequentially reads the target data from the first slave node and the second slave node, the terminal can read the latest version of the target data from both the first slave node and the second slave node. This can ensure that a version of the target data read each time by the terminal is not earlier than a previously read version of the target data, to avoid a rollback of a version of read data.

Figure 5:
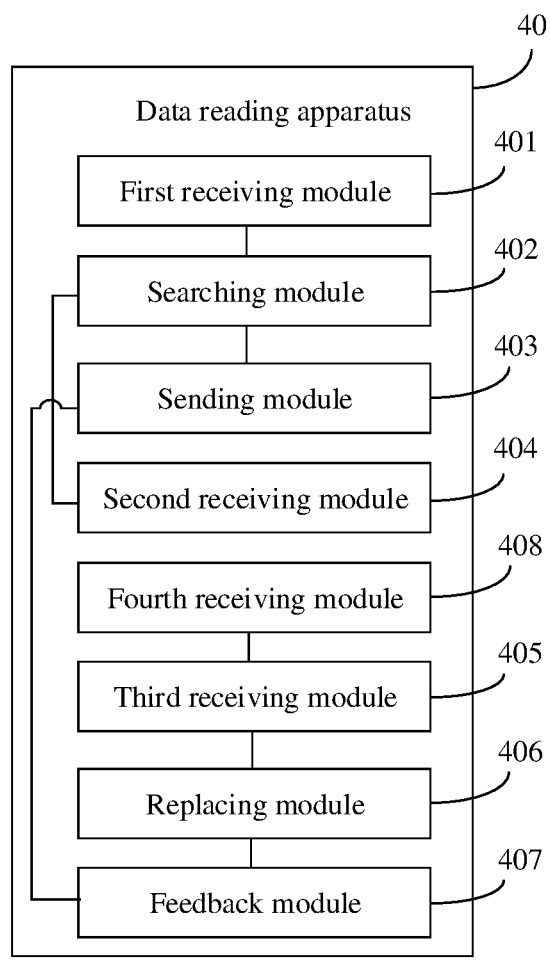
FIG. 5 is a schematic structural diagram of another data reading apparatus according to an embodiment.

Optionally, FIG. 5 is a schematic structural diagram of another data reading apparatus according to an embodiment. As shown in FIG. 5, based on FIG. 4, the data reading apparatus 40 may further include:

a second receiving module 404 configured to receive indication information sent by a master node, where the indication information is used to indicate that the latest version of the target data has been stored in each of the plurality of slave nodes.

Optionally, the searching module 402 may be configured to: obtain, based on the logical address, an index of the target data, and locally search, based on the index of the target data, the first slave node for a latest version of the target data that is corresponding to the index.

Optionally, as shown in FIG. 5, the data reading apparatus 40 may further include:

a third receiving module 405 configured to receive the latest version of the target data and the index that are sent by the master node;

a replacing module 406 configured to: when data corresponding to the index is locally stored in the first slave node, replace, with the latest version of the target data, the data that is corresponding to the index and that is locally stored in the first slave node; and a feedback module 407 configured to send a feedback, to the master node, that the latest version of the target data has been locally stored.

Optionally, as shown in FIG. 5, the data reading apparatus 40 may further include:

a fourth receiving module 408 configured to: when receiving the latest version of the target data sent by the master node, receive a version number of the latest version sent by the master node; and the feedback module 407 configured to send storage feedback information to the master node, where the storage feedback information includes the index and the version number of the latest version, and the indication information includes the index and the version number of the latest version.

Therefore, in the data reading apparatus provided in this embodiment, after the receiving module receives the data read request, the searching module may search, based on the data read request, for the latest version of the target data, and after it is determined that the latest version has been stored in each slave node, the sending module sends the latest version of the target data to the terminal. When the first slave node completes copying the latest version of the target data, and the second slave node has not completed copying the latest version of the target data, if the terminal sequentially reads the target data from the first slave node and the second slave node, the terminal can read the latest version of the target data from both the first slave node and the second slave node. This can ensure that a version of the target data read each time by the terminal is not earlier than a previously read version of the target data, to avoid a rollback of a version of read data.

In addition, because each node needs to store only the latest version of the target data, comparatively less data is stored in each node, and load of the distributed system is comparatively small. In addition, when the terminal reads the target data from a slave node, if the latest version of the target data is stored in the slave node, and it is determined that the latest version has been stored in each slave node, the latest version of the target data may be immediately sent to the terminal. This enables the terminal to quickly read the latest version of the target data, thereby reducing a data reading delay.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure(s) or functions according to the embodiments are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium, a semiconductor medium (for example, a solid-state drive), or the like.

It can be noted that the method embodiment provided in the embodiments and the corresponding apparatus embodiments can be referenced to each other. This is not limited in the embodiments.

The foregoing descriptions are merely optional embodiments and are not limiting. Any modification, equivalent replacement, or improvement made without departing from the spirit and principle of embodiments should fall within the protection scope.

What is claimed is:

1. A data reading method in a distributed system, the distributed system comprising a master node and a plurality of slave nodes, the method performed by a first slave node, and the method comprising:
   receiving a data read request sent by a terminal, the data read request comprising a logical address of target data;
   locally searching, based on the logical address, the first slave node for a latest version of the target data;
   searching indication information sent by the master node;
   detecting whether the indication information includes an index of the target data and a version number of the latest version of the target data;
   determining the latest version of the target data is stored in each of the plurality of slave nodes in response to a detecting result that the indication information includes the index of the target data and the version number of the latest version of the target data; and
   when the latest version of the target data has been stored in each of the plurality of slave nodes, sending the latest version of the target data to the terminal.

2. The method according to claim 1, further comprising:
   receiving the indication information sent by the master node, wherein the indication information is used to indicate that the latest version of the target data has been stored in each of the plurality of slave nodes.

3. The method according to claim 1, wherein the locally searching, based on the logical address, of the first slave node for a latest version of the target data comprises:
   obtaining, based on the logical address, the index of the target data; and
   locally searching, based on the index of the target data, the first slave node for a latest version of the target data that is corresponding to the index.

4. The method according to claim 3, further comprising:
   receiving the latest version of the target data and the index that are sent by the master node;
   when data corresponding to the index is locally stored in the first slave node, replacing, with the latest version of the target data, the data that is corresponding to the index and that is locally stored in the first slave node; and
   sending a feedback, to the master node, that the latest version of the target data has been locally stored.

5. The method according to claim 4, further comprising:
   when receiving the latest version of the target data sent by the master node, receiving the version number of the latest version sent by the master node; and
   the sending of the feedback, to the master node, that the latest version of the target data has been locally stored comprises: sending storage feedback information to the master node, wherein the storage feedback information comprises the index and the version number of the latest version, and the indication information comprises the index and the version number of the latest version.

6. A distributed system, comprising a master node and a plurality of slave nodes,
a first slave node of the plurality of slave nodes is configured to:
receive a data read request sent by a terminal, wherein the data read request comprises a logical address of target data;
locally search, based on the logical address, the first slave node for a latest version of the target data; and
when the latest version of the target data has been stored in each of the plurality of slave nodes, send the latest version of the target data to the terminal,
wherein the first slave node is further configured to:
after finding the latest version of the target data, search indication information sent by the master node;
detect whether the indication information includes an index of the target data and a version number of the latest version of the target data;
determine the latest version of the target data is stored in each of the plurality of slave nodes in response to a detecting result that the indication information includes the index of the target data and the version number of the latest version of the target data.

7. The system according to claim 6, wherein the first slave node is further configured to receive the indication information sent by the master node, wherein the indication information is used to indicate that the latest version of the target data has been stored in each of the plurality of slave nodes.

8. The system according to claim 6, wherein the first slave node is configured to obtain, based on the logical address, an index of the target data; and locally search, based on the index of the target data, the first slave node for a latest version of the target data that is corresponding to the index.

9. The system according to claim 8, wherein the first slave node is further configured to:
receive the latest version of the target data and the index that are sent by the master node;
when data corresponding to the index is locally stored in the first slave node, replace, with the latest version of the target data, the data that is corresponding to the index and that is locally stored in the first slave node; and
send a feedback, to the master node, that the latest version of the target data has been locally stored.

10. The system according to claim 9, wherein the first slave node is further configured to: receive the version number of the latest version sent by the master node, when receiving the latest version of the target data sent by the master node; and
the first slave node is configured to: send storage feedback information to the master node, wherein the storage feedback information comprises the index and the version number of the latest version, and wherein the indication information comprises the index and the version number of the latest version.

* * * * *